United States Patent [19]

Yamada et al.

[11] Patent Number: 4,702,581
[45] Date of Patent: Oct. 27, 1987

[54] FLASH DEVICE FOR CAMERA

[75] Inventors: Yasuyuki Yamada, Tokyo; Yasuhisa Sato, Kanagawa; Hiroki Nakayama, Kanagawa; Kouji Oizumi, Kanagawa, all of Japan

[73] Assignee: Canon Kabushiki Kaisha, Tokyo, Japan

[21] Appl. No.: 814,629

[22] Filed: Dec. 30, 1985

[30] Foreign Application Priority Data

Dec. 28, 1984 [JP] Japan ............... 59-197487[U]

[51] Int. Cl.$^4$ ............................................. G03B 15/03
[52] U.S. Cl. ................................ 354/126; 354/145.1; 354/149.11; 362/16
[58] Field of Search ............... 354/126, 145.1, 149.11; 362/16, 17, 18

[56] References Cited

U.S. PATENT DOCUMENTS

| 4,106,037 | 8/1978 | Nakamura et al. | 354/145.1 |
| 4,141,059 | 2/1979 | Shiojiri | 362/16 |
| 4,166,680 | 9/1979 | Maitani | 354/126 |
| 4,234,906 | 11/1980 | Schindler | 362/16 |
| 4,239,369 | 12/1980 | English et al. | 362/16 |
| 4,356,538 | 10/1982 | Plummer | 362/16 |
| 4,412,276 | 10/1983 | Blinow | 362/16 |
| 4,519,687 | 5/1985 | Kuge | 354/149.11 |
| 4,557,574 | 12/1985 | Kohno et al. | 354/149.11 |

Primary Examiner—A. A. Mathews
Attorney, Agent, or Firm—Toren, McGeady & Associates

[57] ABSTRACT

A flash device for a camera having a light emitting window of rectangular shape oriented so that the long side of the window is nearly perpendicular to a long side of the film format in the camera. An optical panel in the light emitting window is constructed in such a way as to satisfy the following conditions:

$0.5 < f1/f < 1.5$ $f2/f < 0.5,$ where f1 is the focal length of an end portion of the longitudinal length of the optical panel, f2 is the focal length of a central portion of the optical panel, and f is the focal length of a photographic lens of the camera.

8 Claims, 28 Drawing Figures

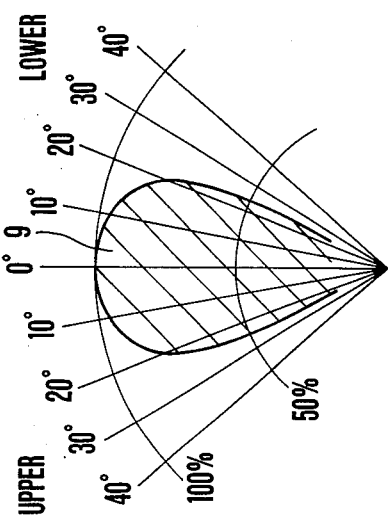
F I G. 15
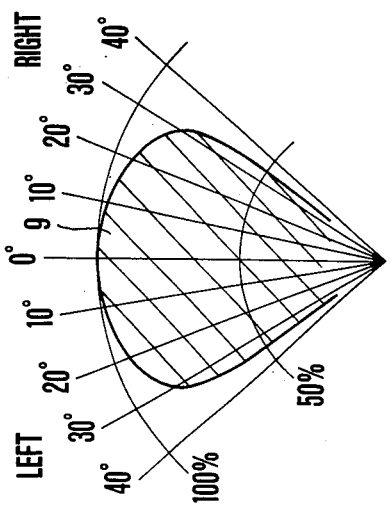
F I G. 16
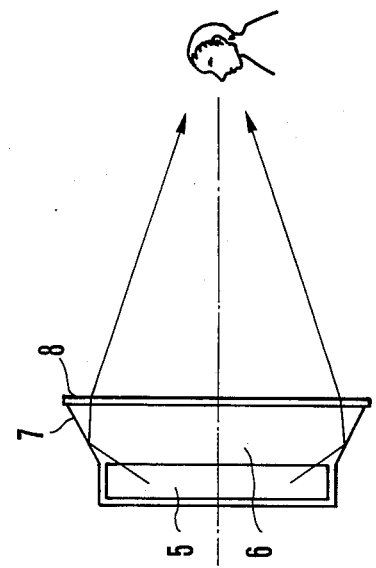
F I G. 13
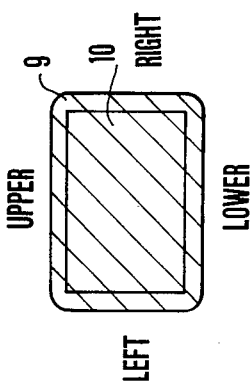
F I G. 14

4,702,581

FLASH DEVICE FOR CAMERA

BACKGROUND OF THE INVENTION

1. Field of the Invention

This invention relates to flash devices for cameras, and more particularly to flash devices for cameras in which a window from which flash light issues is oriented so that the long side of the window is perpendicular to the long side of the film format in the camera.

2. Description of the Prior Art

Recently, a wide variety of improvements have been made to minimize the size of cameras. Of these, there is a proposal for changing the orientation of the rectangular window of the flash device to facilitate a further minimization of the size of the camera. FIG. 1(a) illustrates the conventional orientation of the window of the flash device, in which the window 2 of the flash device is disposed with its long side in coincidence with the lateral direction of the camera body 1. According to the aforesaid proposal, the window 2 is vertically erected as shown in FIG. 2(a), thereby the lateral length of the camera body is shortened. In this case, however, because the flash light distributing area of the flash device becomes longer in the vertical direction than in the horizontal direction, the matching of the flash light distributing area 4 with the photographic area 3, which has so far been established as shown in FIG. 1(b), is now broken as shown in FIG. 2(b), producing a problem that an under-exposure results in both of the side portions of the area of the film format 3.

An attempt has been made to spread the flash light distributing area more widely in the horizontal direction by changing the reflector of the flash device to a deeper shape in Japanese Laid-Open Utility Model Application No. SHO 57-112330.

However, this method hinders the minimization of the size of the camera by an amount corresponding to the increase in depth of the reflector, and can not be said to be a very good idea.

SUMMARY OF THE INVENTION

With the foregoing in mind, the present invention has been made, and its object is to provide a flash device for a camera in which an optical panel in the window of the flash device is constructed in such a way that the focal lengths f1 and f2 of marginal and central portions of the longitudinal length of the optical panel respectively are related to the focal length f of a photographic lens of the camera as follows:

$$0.5 < f1/f < 1.5$$

$$f2/f < 0.5$$

whereby even when the window is oriented with its long side in a direction perpendicular to the long side of the film format in the camera, a proper flash light distributing characteristic over the entire photographic area without sacrificing the minimization of the size of the camera.

Other objects will become apparent from the following description of an embodiment thereof.

BRIEF DESCRIPTION OF THE DRAWINGS

FIGS. 13 to 16 illustrate still another flash light distrubuting characteristic with the optical panel of FIGS. 4(a) and 4(b) having an appropriate refractive power.

DETAILED DESCRIPTION OF THE PREFERRED EMBODIMENT

The present invention is next described in connection with an embodiment thereof by reference to the drawings.

Figure 1A:
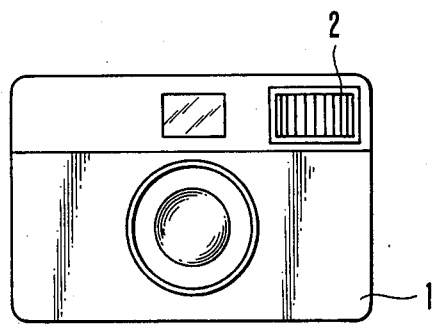
FIGS. 1(a) and 1(b) illustrate the conventional arrangement of the flash device window in the camera with respect to the film format, with FIG. 1(a) being a front elevational view of the camera and FIG. 1(b) being a plan view of the flash-exposed area just matched to the film format.
Figure 1B:
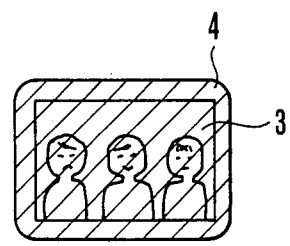
Figure 2A:
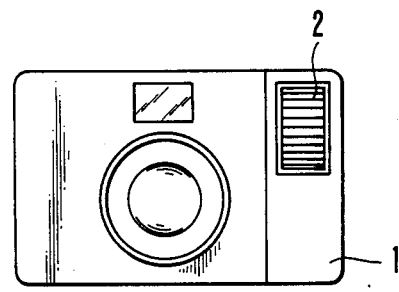
FIGS. 2(a) and 2(b) illustrate an improved arrangement of the camera and flash device of FIG. 1(a), with FIG. 2(a) being a front elevational view of the camera and FIG. 2(b) being a plan view of a change of the flash light distributing characteristic.
Figure 2B:
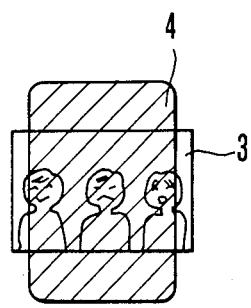
Figure 3A:
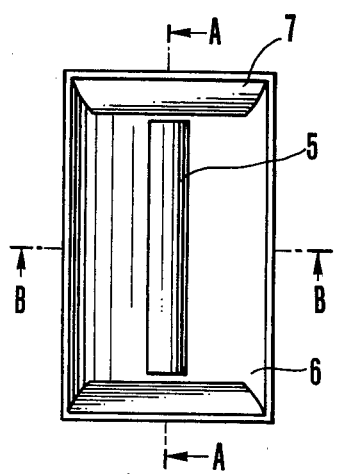
FIGS. 3(a), 3(b) and 3(c) illustrate the structure of construction of a flash light issuing portion of the invention, with FIG. 3(a) being a front elevational view, FIG. 3(b) being a cross-sectional view taken along A—A line of FIG. 3(a), and FIG. 3(c) being a cross-sectional view taken along B—B line of FIG. 3(a).
Figure 3B:
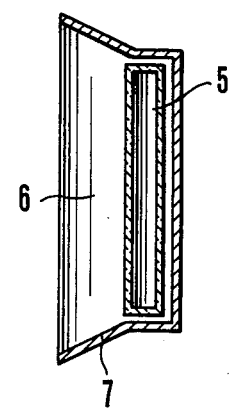
Figure 3C:
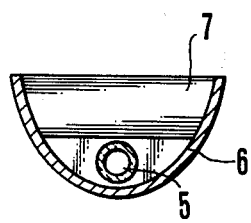

FIG. 3(a) in front view illustrates the flat and curved portions of a reflector of the flash device according to the invention. FIG. 3(b) is an A—A line cross-section of FIG. 3(a), and FIG. 3(c) is a B—B line cross-section of FIG. 3(a).

Figure 4A:
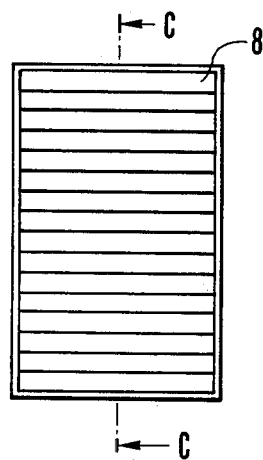
FIGS. 4(a) and 4(b) illustrate the construction of an optical panel according to the invention, FIG. 4(a) being a front view, and FIG. 4(b) being a cross-sectional view taken along C—C line of FIG. 4(a).
Figure 4B:
Figure 7:
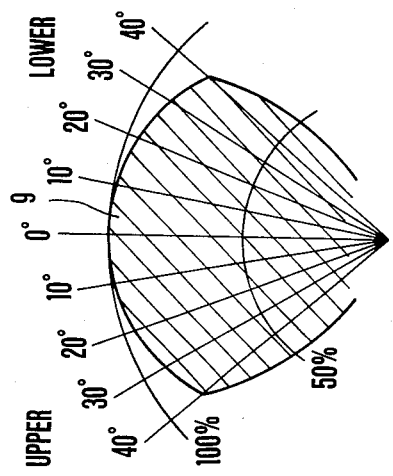
FIGS. 5 to 8 illustrate a flash light distributing characteristic with the optical panel of FIG. 4(a) and 4(b) having a too weak refractive power.
Figure 8:
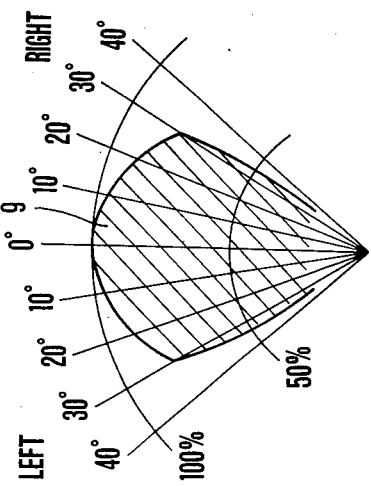
Figure 5:
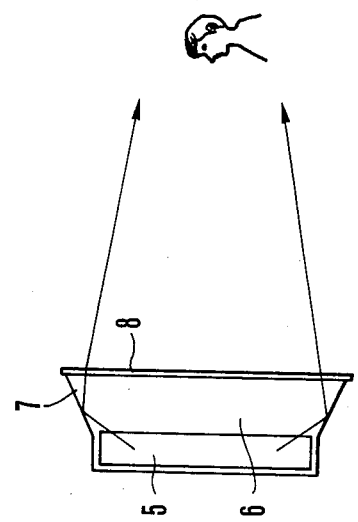
Figure 6:
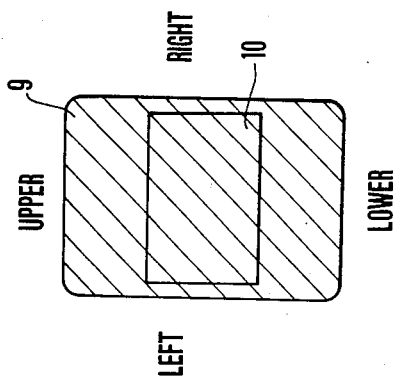
Figure 11:
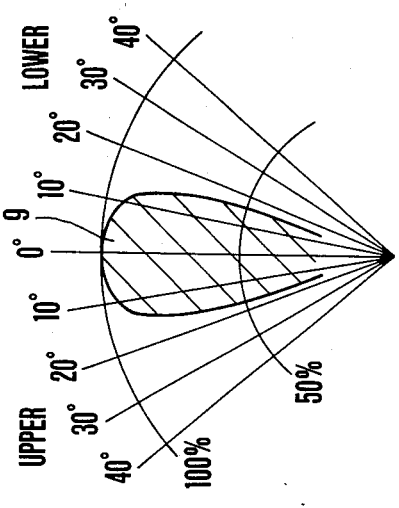
FIGS. 9 to 12 illustrate another flash light distributing characteristic with the optical panel of FIGS. 4(a) and 4(b) having a too strong refractive power.
Figure 12:
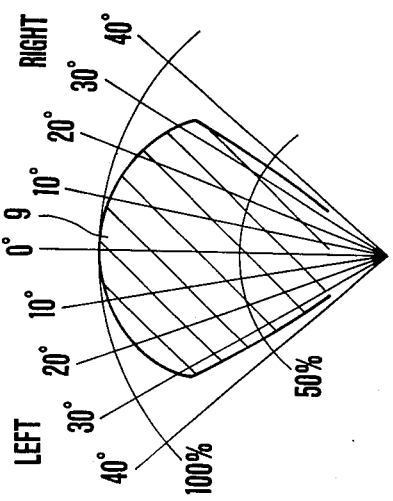
Figure 9:
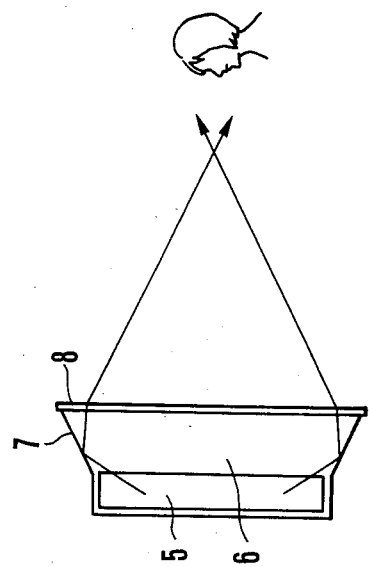
Figure 10:
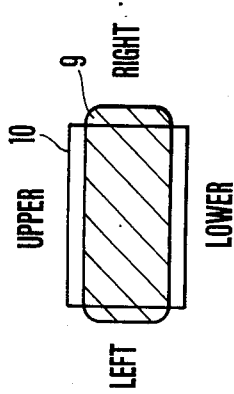

5 is flash discharge tube; 6 and 7 are curved and flat portions respectively of the reflector by which flash light from the discharge tube 5 is reflected to an object to be photographed. The flash discharge tube 5 and reflectors 6 and 7 constitute a flash light issuing portion of the flash device. FIG. 4(a) is a front view of the optical panel of the flash device according to the invention, and FIG. 4(b) is a cross-sectional view taken along C—C line of the FIG. 4(a). In FIG. 4(a), the optical panel 8 covers a front opening of the flash light issuing portion, not only protecting the flash light issuing portion but also playing a role of correcting flash light from the flash light issuing portion to a proper flash light distributing area. The opening is arranged so that its long side makes an almost right angle with the direction of the long side of the film format in the camera. The term "almost right angle" herein used means that the angle is not necessarily just 90°, but may lie in a range of somewhat larger or smaller angles than 90°, which is also included within the scope of the invention. The optical panel is constructed as a Fresnel lens having refractive powers in the longitudinal direction of the window.

By the way, this optical panel 8 has such a characteristic that when the refractive is not sufficient, the flash distributing area is vertically elongated in excess of the photographic area 10, as shown in FIGS. 5 to 8 and the guide number of the strobe is caused to lower. That is, the efficiency of flash lighting is lowered.

Conversely, when the refractive power is too strong, insufficient illumination takes place in the vertical direction of the photographic area as shown in FIGS. 9 to 12.

Hence, the optical panel 8 is made to have relationships for the focal lengths f1 and f2 of the marginal and central portions of the longitudinal length of the window relative to the focal length f of the photographic lens as follows:

$$0.5 < f1/f < 1.5$$

$$f2/f < 0.5$$

When the f1/f and f2/f exceed the upper limits, the refracting actions become insufficient causing the flash light distributing area to be vertical larger than the hotographic area, and therefore causing the efficiency to be lowered. When the lower limit is exceeded, because the refracting action is too strong, the flash light distributing area is vertically shorter than the photographic area, so that an insufficient distribution takes place in either of the marginal portions of the lateral length of the film format.

Meanwhile, if the optical panel 8 satisfies the above-stated relationships, the refracting action of the optical panel is proper as shown in FIGS. 13 to 16, the flash light distributing area 9 being very effective in the longitudinal and lateral directions of the photographic area 10.

Next, a concrete embodiment of the optical panel 8 is shown.

Figure 17:
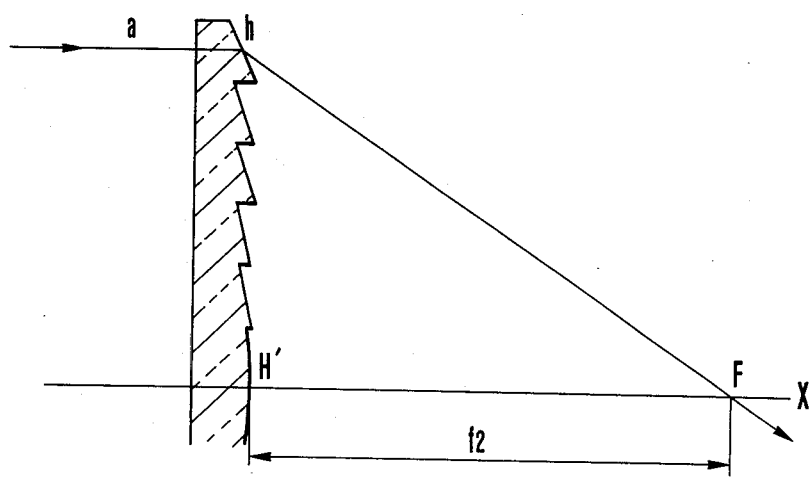
FIGS. 17 and 21 are diagram considered to define the design parameters of the optical panel of the invention.

It should be noted that the focal length f2 of the optical panel 8 is defined as shown in FIG. 17. That is, a parallel ray, a, to an optical axis X of the optical panel 8 after having refracted at a point h on the optical panel intersects the optical axis X at a point F. The distance from the rear principal point H' of the optical panel 8 on the optical axis X to that point F, or $\overline{H'F}$, is determined to be the focal length f2.

Figure 18:
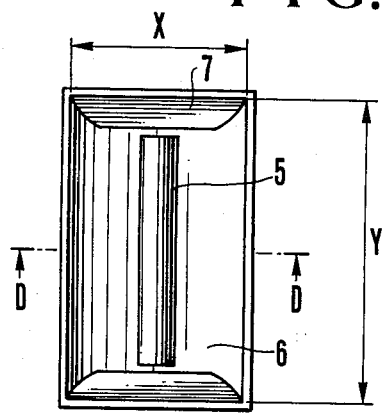
FIG. 18 is a front elevational view of a reflector for the flash tube with definition of design parameters in numerical specific examples of the invention.
Figure 19:
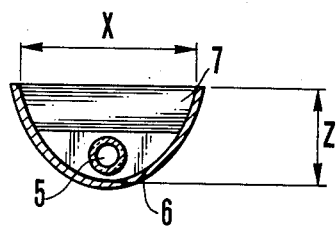
FIG. 19 is a cross-sectional view taken along D—D line of FIG. 18.

FIG. 18 is a front view of the flash light issuing portion. The opening of this portion has a relationship: Y > X where Y is the height, and X is the width. Also, FIG. 19 represents the cross-section along D—D line of FIG. 18, and the depth of the curved portion 6 of the reflector is Z.

At first, numerical examples of the dimensions of the flash light issuing portion are shown below.

| X = 10.0 mm, Y = 18.6 mm, Z = 7.0 mm | |
|---|---|
| X/2 (mm) | Z (mm) |
| 0 | 0 |
| 0.5 | 0.035 |
| 1 | 0.141 |
| 1.5 | 0.322 |
| 2 | 0.584 |
| 2.5 | 0.938 |
| 3 | 1.400 |
| 3.5 | 2.001 |
| 4 | 2.800 |

| -continued | |
|---|---|
| X = 10.0 mm, Y = 18.6 mm, Z = 7.0 mm | |
| X/2 (mm) | Z (mm) |
| 4.5 | 3.949 |
| 5 | 7.000 |

Figure 20:
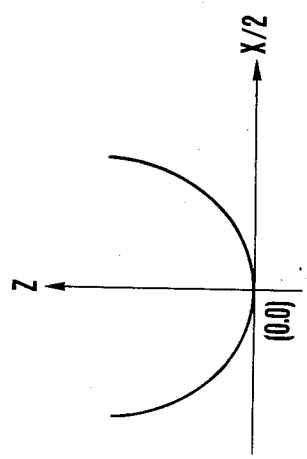
FIG. 20 is a graph illustrating the cross-section of the reflector in the numerical examples.

The shape of the flash light issuing portion based on the above-cited numerical examples is shown in FIG. 20.

Figure 21:
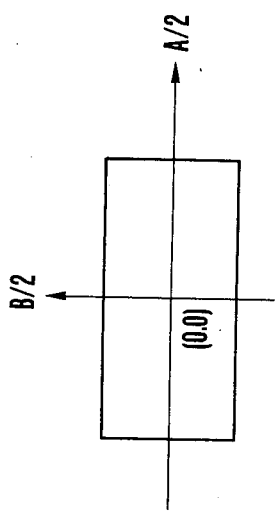

Next, numerical examples of the optical panel defined in FIG. 21 are shown below. A is the vertical length of the optical panel in FIG. 4(a) and B is the lateral width.

| A/2 (mm) | f (mm) |
|---|---|
| 0–1.5 | 4.5 |
| 1.5–3.0 | 11.9 |
| 3.0–4.5 | 17.7 |
| 4.5–6.0 | 22.1 |
| 6.0–7.5 | 25.5 |
| 7.5–9.0 | 27.9 |
| 9.0–9.6 | 28.2 |
| 9.6–10.5 | 30.5 |

Figure 22:
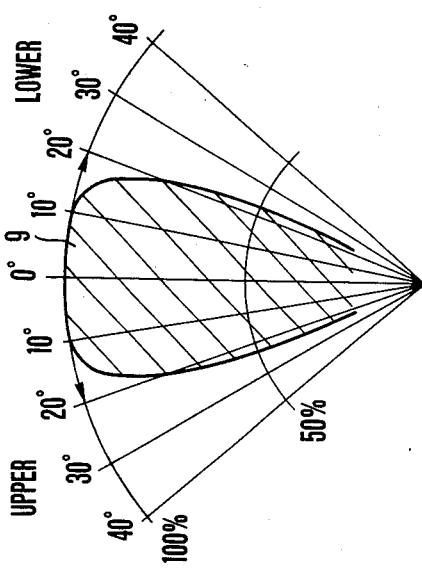
FIGS. 22 and 23 are lobe diagrams of the numerical examples of the reflector with the optical panel.
Figure 23:
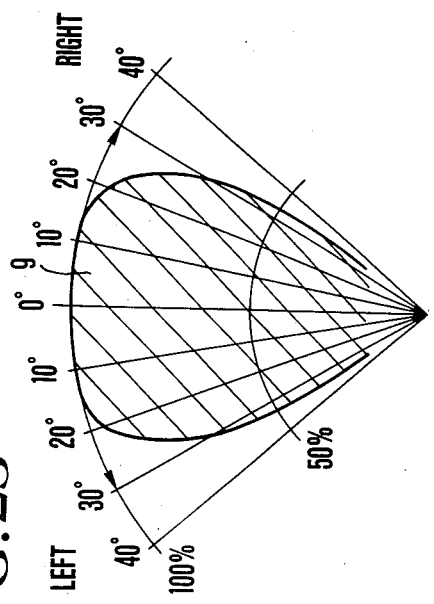

The above-cited practical examples of the optical panel are formed in relation to the photographic lens whose image angle is about 30°, and its flash light distributing characteristic is shown in FIGS. 22 and 23.

It should be notedthat, though, in the above-described embodiment, the optical panel is shown as a lateral Fresnel lens whose refractive power varies in the longitudinal direction, this is because, in the case of such a lateral Fresnel lens, little influence is given to the light distribution of a direction perpendicular to the longitudinal direction, so that the flash light distributing area can be narrowed only in the direction perpendicular to the longitudinal direction of the photographic area, for the design of the optical panel becomes very easy. In this case, the flash light distributing area in the longitudinal direction of the photographic area is determined by the shape of the curved portion of the reflector. It should be noted that, it is needless to say that use may be made of a Fresnel lens which gives influence to both of the longitudinal direction of the optical panel and the direction perpendicular thereto, as in a circular Fresnel lens.

Also, the flash device may be either integral with the camera body, or releasably attached thereto. What is essential is that if the long side of the window of the flash device is nearly perpendicular to the long side of the film format in the camera, the invention can be applied thereto.

As has been described above, the present invention is to construct the optical panel in such a way that the focal length f1 of the marginal portions of the longitudinal length of the window and the focal length f2 of the central portion of the window fall within the following ranges in terms of the focal length f of the photographic lens:

$$0.5 < f1/f < 1.5$$

$$f2/f < 0.5$$

Therefore, even in the flash device for camera where the window is oriented with its long side in the direction perpendicular to the long side of the film format in the camera in order to minimize the size of the camera, a proper flash light distributing characteristic over the entire photographic area can be obtained without sacrificing the minimization of the size of the camera. Thus, the invention produces a great advantage.

It should be noted that, the advantage of the invention can be enjoyed particularly when applied to a camera having a photographic lens of more than 23° in the image angle. This is because even the flash device using an optical panel which does not satisfy the relationships of the invention hardly results in underexposure only in the marginal zone of the image format when a longer focal length lens is used, since the image angle is narrow.

What is claimed is:

1. A flash device for a camera having a photographic lens and a photographic area of a shape definable in a longitudinal direction, comprising:
   (a) flash light generating means for generating a flash light;
   (b) a flash issuing opening of a shape definable in a longitudinal direction, said flash issuing opening having the longitudinal direction thereof being arranged at substantially a right angle to the longitudinal direction of said photographic area of said camera; and
   (c) an optical panel provided in front of said flash issuing opening, said optical panel having at least two focal lengths of which a first focal length corresponds to a longitudinal periphery of said flash issuing opening, while a second focal length corresponds to a center of said flash issuing opening, said first and said second focal lengths satisfying the following conditions:

$0.5 < f1/f < 1.5$ $f2/f < 0.5$, in which f1, represents said first focal length, f2 represents said second focal length, and f represents a focal length of said photographic lens.

2. A flash device for a camera having a photographic lens and a photographic area of substantially a rectangular shape, comprising:
   (a) flash light generating means for generating a flash light;
   (b) a flash issuing opening having substantially a rectangular shape, said flash issuing opening having a longitudinal direction thereof arranged at substantially a right angle to a longitudinal direction of said photographic area; and
   (c) an optical panel provided in front of said flash issuing opening, said optical panel having at least two focal lengths of which a first focal length corresponds to a longitudinal periphery of said flash issuing opening, while a second focal length corresponds to a center of said flash issuing opening, said first and said second focal lengths satisfying the following conditions:

$0.5 < f1/f < 1.5$ $f2/f < 0.5$, in which f1, represents said first focal length, f2 represents said second focal length, and f represents a focal length of said photographic lens.

3. A flash device according in claim 2, wherein said optical panel includes a lateral Fresnel lens.

4. A flash device for a camera having a photographic lens and a photographic area of a shape definable in a longitudinal direction, comprising:
   (a) flash light generating means for generating a flash light;
   (b) a flash issuing opening of a shape definable in a longitudinal direction, said flash issuing opening having the longitudinal direction thereof being arranged at substantially a right angle to the longitudinal direction of said photographic area of said camera; and
   (c) an optical panel provided in front of said flash issuing opening, said optical panel functioning to adapt a light distribution of the flash light projected from said flash issuing opening to the shape of said photographic area.

5. A camera having a flash device, comprising:
   (a) a photographic lens;
   (b) a photographic area of a shape definable in a longitudinal direction;
   (c) flash light generating means for generating a flash light;
   (d) a flash issuing opening of a shape definable in a longitudinal direction, said flash issuing opening having the longitudinal direction thereof being arranged at substantially a right angle to the longitudinal direction of said photographic area of said camera; and
   (e) an optical panel provided in front of said flash issuing opening, said optical panel having at least two focal lengths of which a first focal length corresponds to a longitudinal periphery of said flash issuing opening, while a second focal length corresponds to a center of said flash issuing opening, said first and said second focal lengths satisfying the following conditions:

$0.5 < f1/f < 1.5$ $f2/f < 0.5$, in which f1, represents said first focal length, f2 represents said second focal length, and f represents a focal length of said photographic lens.

6. A camera having a flash device, comprising:
   (a) a photographic lens;
   (b) a photographic area of a substantially rectangular shape;
   (c) flash light generating means for generating a flash light;
   (d) a flash issuing opening having substantially a rectangular shape, said flash issuing opening having a longitudinal direction thereof arranged at substantially a right angle to a longitudinal direction of said photographic area; and
   (e) an optical panel provided in front of said flash issuing opening, said optical panel having at least two focal lengths of which a first focal length corresponds to a longitudinal periphery of said flash issuing opening, while a second focal length corresponds to a center of said flash issuing opening, said first and said second focal lengths satisfying the following conditions:

$0.5 < f1/f < 1.5$ $f2/f < 0.5$, in which f1, represents said first focal length, f2 represents said second focal length, and f represents a focal length of said photographic lens.

7. A camera according to claim 6, wherein said optical panel includes a lateral Fresnel lens.

8. A camera having a flash device, comprising:
(a) a photographic lens;
(b) a photographic area of a shape definable in a longitudinal direction;
(c) flash light generating means for generating a flash light;
(d) a flash issuing opening of a shape definable in a longitudinal direction, said flash issuing opening having the longitudinal direction thereof being arranged at substantially a right angle to the longitudinal direction of said photographic area of said camera; and
(e) an optical panel provided in front of said flash issuing opening, said optical panel functioning to adapt a light distribution of the flash light projected from said flash issuing opening to the shape of said photographic area.

* * * * *